United States Patent
Takigawa et al.

(10) Patent No.: US 10,318,218 B2
(45) Date of Patent: Jun. 11, 2019

(54) MANAGEMENT APPARATUS, INFORMATION PROCESSING SYSTEM, AND NON-TRANSITORY RECORDING MEDIUM

(71) Applicants: Minako Takigawa, Tokyo (JP); Kazuhiro Mukai, Kanagawa (JP)

(72) Inventors: Minako Takigawa, Tokyo (JP); Kazuhiro Mukai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 13 days.

(21) Appl. No.: 15/875,337

(22) Filed: Jan. 19, 2018

(65) Prior Publication Data
US 2018/0210686 A1    Jul. 26, 2018

(30) Foreign Application Priority Data

Jan. 24, 2017    (JP) ................................. 2017-010244

(51) Int. Cl.
*G06F 3/12* (2006.01)
*H04N 1/00* (2006.01)
(Continued)

(52) U.S. Cl.
CPC .......... *G06F 3/1238* (2013.01); *G06F 3/1222* (2013.01); *G06F 3/1232* (2013.01);
(Continued)

(58) Field of Classification Search
None
See application file for complete search history.

(56) References Cited

U.S. PATENT DOCUMENTS

2009/0168100 A1* 7/2009 Huster .................. G06F 3/1212
358/1.15
2013/0120784 A1* 5/2013 Takagi ................ H04N 1/0023
358/1.14
(Continued)

FOREIGN PATENT DOCUMENTS

EP    2947559 A1 * 11/2015 ........... G06F 3/1237
EP    2947559 A1    11/2015
(Continued)

OTHER PUBLICATIONS

European Search Report for European Application No. 18152865.4 dated May 23, 2018.

*Primary Examiner* — Neil R McLean
*Assistant Examiner* — Pawan Dhingra
(74) *Attorney, Agent, or Firm* — Harness, Dickey & Pierce, P.L.C.

(57) ABSTRACT

An information processing system includes one or more information processing apparatuses to individually store a print job executable with an image forming apparatus, and a management apparatus. Each information processing apparatus includes a first memory to store the print job and first circuitry to transmit, through a network, user identification information identifying one or more users who are allowed to execute the print job. The management apparatus includes a second memory to store association information associating for each print job the user identification information transmitted from the first circuitry and apparatus identification information identifying one of the one or more information processing apparatus storing the print job, and second circuitry to refer the association information and specify apparatus identification information of at least one of the one or more information processing apparatuses, and to
(Continued)

transmit a list of information processing apparatuses through the network.

17 Claims, 14 Drawing Sheets

(51) Int. Cl.
    *H04N 1/32*           (2006.01)
    *H04N 1/44*           (2006.01)

(52) U.S. Cl.
    CPC .......... *G06F 3/1239* (2013.01); *G06F 3/1267* (2013.01); *G06F 3/1274* (2013.01); *G06F 3/1288* (2013.01); *H04N 1/0023* (2013.01); *H04N 1/00344* (2013.01); *H04N 1/32122* (2013.01); *H04N 1/4413* (2013.01); *H04N 1/4426* (2013.01); *H04N 2201/0039* (2013.01); *H04N 2201/0094* (2013.01); *H04N 2201/3205* (2013.01); *H04N 2201/3219* (2013.01)

(56) References Cited

U.S. PATENT DOCUMENTS

| | | | |
|---|---|---|---|
| 2015/0103370 A1* | 4/2015 | Takigawa | G06F 3/1267 358/1.14 |
| 2015/0339086 A1 | 11/2015 | Hakozaki | |
| 2016/0196096 A1* | 7/2016 | Nishida | G06F 3/1288 358/1.15 |

FOREIGN PATENT DOCUMENTS

| | | |
|---|---|---|
| JP | 2011-081741 | 4/2011 |
| JP | 2012-113384 | 6/2012 |
| JP | 2015-219854 | 12/2015 |

* cited by examiner

FIG. 9

| PRINT JOB ID | PRINT DATA |
|---|---|
| J1 | PRINT DATA d1 |
| J2 | PRINT DATA d2 |
| J3 | PRINT DATA d3 |
| J4 | PRINT DATA d4 |
| J5 | PRINT DATA d5 |
| J6 | PRINT DATA d6 |
| J7 | PRINT DATA d7 |
| J8 | PRINT DATA d8 |
| J9 | PRINT DATA d9 |
| J10 | PRINT DATA d10 |
| . | . |
| . | . |
| . | . |

FIG. 10

| PRINT JOB ID | USER IDENTIFICATION INFORMATION | PRINT SETTING INFORMATION | PROXY USER IDENTIFICATION INFORMATION |
|---|---|---|---|
| J1 | a1 | DUPLEX | – |
| J2 | a1 | 2 in 1 | a3 |
| J3 | a2 | DUPLEX | a3 |
| J4 | a3 | . | b1 |
| J5 | a4 | . | b2 |
| J6 | a4 | . | a2 |
| J7 | a4 | . | a2 |
| J8 | a5 | . | a2 |
| J9 | b5 | . | b3 |
| J10 | b6 | . | – |
| . | . | . | – |
| . | . | . | . |

FIG. 11

| OWNER USER IDENTIFICATION INFORMATION | PROXY USER IDENTIFICATION INFORMATION |
|---|---|
| a0 | – |
| a1 | a3 |
| a2 | a3 |
| a3 | b1 |
| a4 | a2, b2 |
| a5 | a2 |
| b5 | b3 |
| b6 | – |
| . | – |
| . | – |
| . | . |

| USER IDENTIFICATION INFORMATION | PROXY USER IDENTIFICATION INFORMATION | THE NUMBER OF JOBS |
|---|---|---|
| a1 | – | 1 |
| a1 | a3 | 1 |
| a2 | a3 | 1 |
| a3 | b1 | 1 |
| a4 | a2 | 3 |
| a5 | a2 | 2 |
| b5 | b3 | 1 |
| b6 | – | 1 |
| . | . | . |
| . | . | . |

1201

PRINT EXECUTER (OWNER USER): a4

PROXY EXECUTER: a2 / b2 / ...

SAVE

| SERVER ID | USER IDENTIFICATION INFORMATION | PROXY USER IDENTIFICATION INFORMATION |
|---|---|---|
| s1 | a1 | − |
| s1 | a1 | a3 |
| s1 | a2 | a3 |
| s1 | a3 | b1 |
| s3 | a4 | a2 |
| s2 | a5 | a2 |
| s1 | b5 | b3 |
| s1 | b6 | − |
| . | . | . |
| . | . | . |

FIG. 15

| CLIENT ID | IP ADDRESS ID | USER IDENTIFICATION INFORMATION | PROXY USER IDENTIFICATION INFORMATION |
|---|---|---|---|
| pc1 | 192.168.1.100 | a1 | – |
| pc1 | 192.168.1.100 | a1 | a3 |
| pc1 | 192.168.1.100 | a2 | a3 |
| pc1 | 192.168.1.100 | a3 | b1 |
| pc3 | 192.168.1.130 | a4 | a2 |
| pc2 | 192.168.1.120 | a5 | a2 |
| pc1 | 192.168.1.100 | b5 | b3 |
| pc1 | 192.168.1.100 | b6 | – |
| . | . | . | . |
| . | . | . | . |

1501

MANAGEMENT APPARATUS, INFORMATION PROCESSING SYSTEM, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2017-010244, filed on Jan. 24, 2017, in the Japan Patent Office, the entire disclosure of which is hereby incorporated by reference herein.

BACKGROUND

Technical Field

The present disclosure relates to a management apparatus, an information processing system, and a non-transitory recording medium.

Related Art

Information processing systems capable of executing a printing method referred to as pull printing are known. The pull printing is a method, which is used when a user performs a print output, using, for example, a personal computer (PC), and the method includes generating print data for a print job and storing the print data in a storage area once, and then outputting (pulling) the print data from the storage area by operating an image forming apparatus. The user executes the print job, with the method, the pull printing, when being near the image forming apparatus.

A storage destination where the print data is stored, or the storage area, in the pull printing is mainly a print server that is a site server set in the image forming apparatus as a data/information reference destination. The image forming apparatus requests for output of the print data. In recent years, a client PC is also selectable as a destination to store the print data.

In the pull printing, when the storage destination of the print data is the print server, the image forming apparatus, which requests for execution of the print job associated with the print data stored in the print server, is usually limited to be provided in the same site with the print server. The same applies to the client PC, which is used as a storage destination and stores the print data.

SUMMARY

An information processing system includes one or more information processing apparatuses to individually store a print job executable with an image forming apparatus, and a management apparatus. Each information processing apparatus includes a first memory to store the print job and first circuitry to transmit, through a network, user identification information identifying one or more users who are allowed to execute the print job. The management apparatus includes a second memory to store association information associating for each print job the user identification information transmitted from the first circuitry and apparatus identification information identifying one of the one or more information processing apparatus storing the print job, and second circuitry to refer the association information and specify apparatus identification information of at least one of the one or more information processing apparatuses, and to transmit a list of information processing apparatuses through the network.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is a table illustrating one example of a data structure of a print data management table according to one of the embodiments;

FIG. 10 is a table illustrating one example of a data structure of a print job management table according to one of the embodiments;

FIG. 11 is a table illustrating a data structure of a proxy settings table according to one of the embodiments;

FIG. 12 is a table illustrating one example of a data structure of a storage information table according to one of the embodiments;

FIG. 15 is a table illustrating one example of a data structure of a client side location information table according to one of the embodiments;

Figure 1:
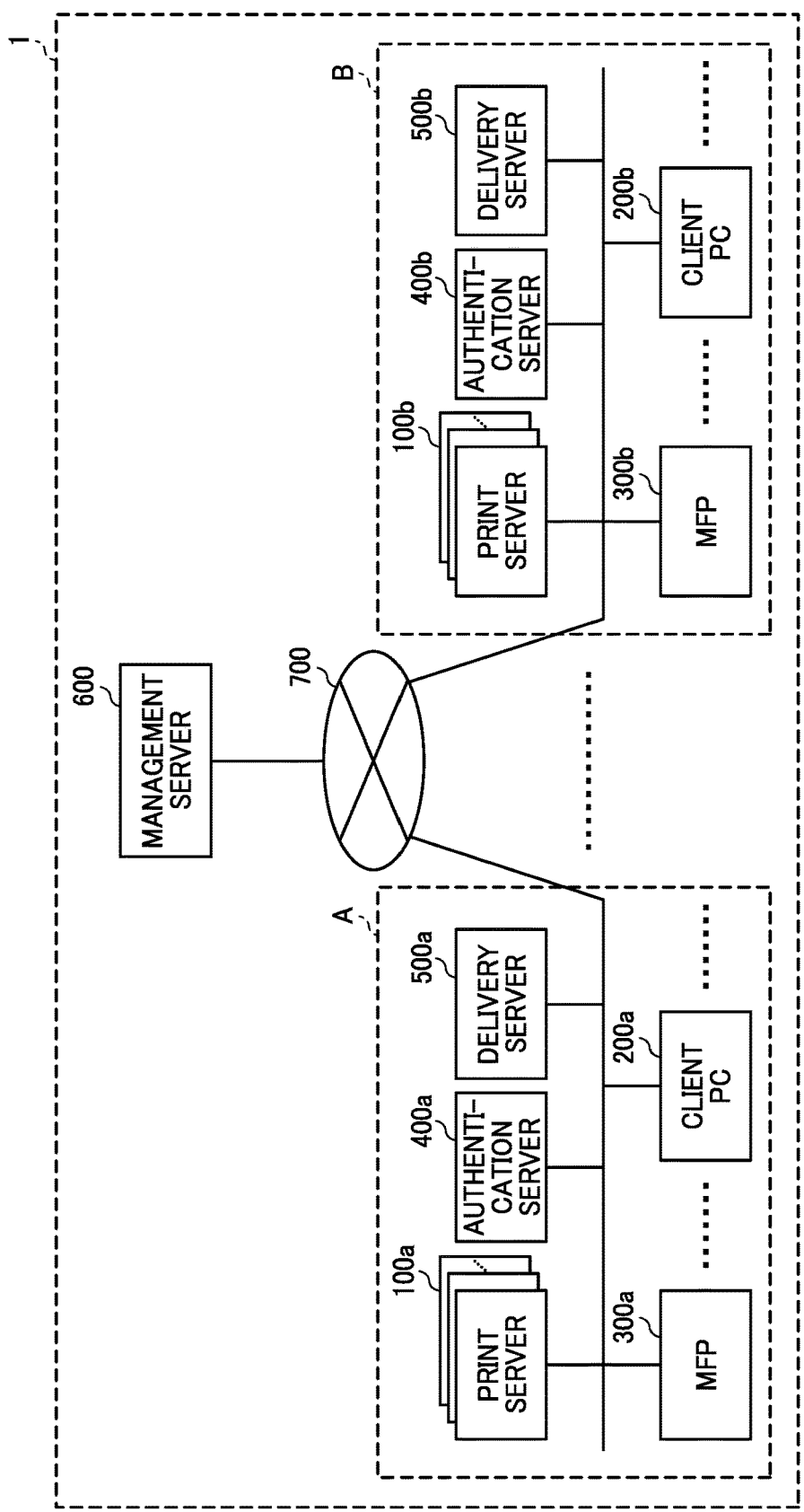
FIG. 1 is a schematic block diagram illustrating an overall configuration of a printing system according to one of the embodiments of the present disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

An information processing apparatus, an information processing system, and a control program executed in the information processing apparatus, according to one of the embodiments of the present disclosure, are described below with reference to the drawings.

The present disclosure is not limited to specific embodiments described below, and numerous additional modifications and variations are possible in light of the teachings within the technical scope of the appended claims.

According to one of the embodiments, an execution request for a print job stored in a print server or a client personal computer (PC), which is an information processing apparatus, located in a site, is received from an image forming apparatus provided in another site that is different from the site where the print server or the client PC storing the print job is provided. More specifically, an information processing system according to one of the embodiments is capable of executing a print job with pull printing performed among a plurality of sites in a manner that a "proxy user" set by a user who originally requests printing, or set the print job, is also able to execute the print job.

(Printing System)

Hereinafter, a description is given of an information processing system, which is a printing system using pull printing, according to one of the embodiments of the disclosure.

FIG. 1 is a schematic block diagram illustrating an overall configuration of a pull printing system 1 according to the present embodiment. In the following description, the pull printing system 1 includes, for example, a plurality of apparatuses each of which is provided at one of a plurality of sites including a site A (first site) and a site B (second site). Each of the site A and the site B is, for example, an office or a facility belonging to a company. For example, the site A is an office or a facility located in Japan and the site B is an office or a facility located in the United States of America. Namely, the plurality of sites are located physically separated from each other. The system using the pull printing, here, in the description, is referred to as the pull printing system 1, however, this does not mean that the system of the disclosure does not include a system using other methods than the pull printing. The system of the disclosure includes systems capable of printing by any other methods than the pull printing, and also a system capable of providing functions other than a printing function.

Additionally, there are two sites, site A and site B, illustrated in FIG. 1, however the embodiment is not limited thereto, and there may be more than two sites. As illustrated in FIG. 1, an alphabet of small letter, "a", is given to at an end of a numeral reference indicating an apparatus belonging to the site A. Similarly, an alphabet of small letter, "b", is given at an end of a numeral reference indicating an apparatus belonging to the site B. In the following description, when common matters of each apparatus are described without distinguishing the site A and the site B, the alphabets, "a" and "b", are omitted from the end of the reference numerals.

The pull printing system 1 includes the plurality of apparatuses each of which is provided in one of the sites. Namely, the pull printing system 1 includes, for example, one or more print servers 100 that are site servers, one or more client PCs 200, one or more multi-function peripherals (MFPs) 300 that are examples of image forming apparatuses, one or more authentication servers 400, and one or more delivery servers (distribution servers) 500. The print servers 100, the client PCs 200, the MFPs 300, the authentication server 400, and the delivery server 500, in the plurality of sites are connected to each other through a local area network (LAN) or a communication network 700 such as the Internet. Namely, the configuration of the pull printing system 1 according to the embodiment enables each print server 100 to support the MFPs 300 belonging to the different site.

(Client PC 200)

The client PC 200, which is one example of the information processing apparatus according to one of the embodiments of the disclosure, is a client terminal that is used by a user in each site. The client PC 200 includes, for example, a general-purpose PC. The client PC 200 according to the embodiment has a function of transmitting a print job to the print server 100, which is another example, or a type, of the information processing apparatus, provided in the same site as the client PC 200, and causing the print server 100 to store the print job. The client PC 200 also has a function of storing the print job by own storage means according to user operation. Namely, the client PC 200 also includes a storage such as a memory to store a print job according to user operation.

(Print Server 100)

The print server 100, which is one example of the information processing apparatus, according to one of the embodiments of the disclosure is set as a data/information reference destination referred by the image forming apparatus, namely the MFP 300, in each site. The print server 100 is a computer configured to receive a print job transmitted from the client PC 200 and stores print data and information included in the print job. The information included in the print job is related to print settings (hereinafter, referred to as print settings information) and includes bibliographic information of the print job. In the embodiment, one or more print servers 100 are provided in a single site. The print server 100 also analyzes the print settings information associated with the print job received from the client PC 200 and transmits, for example, user information associated with the print data to the management server 600. The print server 100 further collects and displays information required to respond to an acquisition request for print data from the MFP 300.

Additionally, the bibliographic information includes "user identification information" (first user identification information) including a user name and a password used for identifying a user who generates the print data, "proxy user identification information", which is a type of user identification information (second user identification information), including a proxy user name and a password used for identifying a proxy user who is delegated authority of executing printing with the print data, and a "print data identifier (ID)" for uniquely identifying the print data. In addition to the bibliographic information, the print settings information includes, for example, information used for specifying the number of copies of printing and a finishing method.

The print server 100 stores print data management information to which "print job ID" is given as identification information for uniquely identifying the print data included in the print job received from the client PC 200. The print server 100 also stores print job management information in which the print job ID is associated with the "user identification information (first user identification information)" and the "proxy user identification information (second user identification information)", and other information included in the print settings information. The print server 100 further stores job executer management information in which the user identification information (first user identification information) and the proxy user identification information (second user identification information) are associated with each other.

(MFP 300)

The MFP 300 has a printing function. According to the user operation, the MFP 300 transmits an acquisition request for the print job management information to the print server 100 belonging to the same site as the MFP 300, and executes a print job based on print data that is transmitted from the print server 100 in response to the acquisition request. That is, address information of the print server 100 belonging to the same site as the MFP 300 is set in advance in the MFP 300, in each site, as a transmission destination of the acquisition request for the print data and the print job management information.

(Authentication Server 400)

The authentication server 400 is configured with one or more information processing apparatuses. The authentication server 400 is a computer that provides a function of authenticating a user who requests, with the MFP 300, for execution of a print job as a user having an authority for the execution.

(Delivery Server 500)

The delivery server 500 is configured with one or more information processing apparatuses. The delivery server 500 is a computer that performs workflow processing, which is set in advance, on subject data (process target data) that includes, for example, data acquired by scanning a document with the MFP 300 and data transmitted from the client PC 200.

(Management Server 600)

The management servers 600 is a computer that is communicably connected to each print server 100, each authentication server 400, and each delivery server 500 provided in one of the plurality of sites, through the communication network 700 such as the Internet or the LAN. The management server 600 is a management apparatus that manages information and distributes the information including the print data and the print job management information among the plurality of sites. That is, the management server 600 enables, for example, the MFP 300a in the site A to execute a print job using print data stored in the print server 100b in the site B. Additionally the management server 600 enables, for example, the MFP 300a in the site A to execute the print job using the print data stored in the print server 100b in the site B by a proxy user.

The management server 600 centrally stores user information that is stored in the authentication server 400 of each site and location information indicating a location of information associated with a print job stored in the print server 100 and/or the client PC 200 of each site. Additionally, the management server 600 is provided at a location independent of each of the sites, such as, for example, a data center. In some of the embodiments, the information processing apparatus having the same function as the management server 600 is provided in one of the sites. In this case, one of the print servers 100 may serve as the management server 600.

(Hardware Configuration of Print Server 100)

Figure 2:
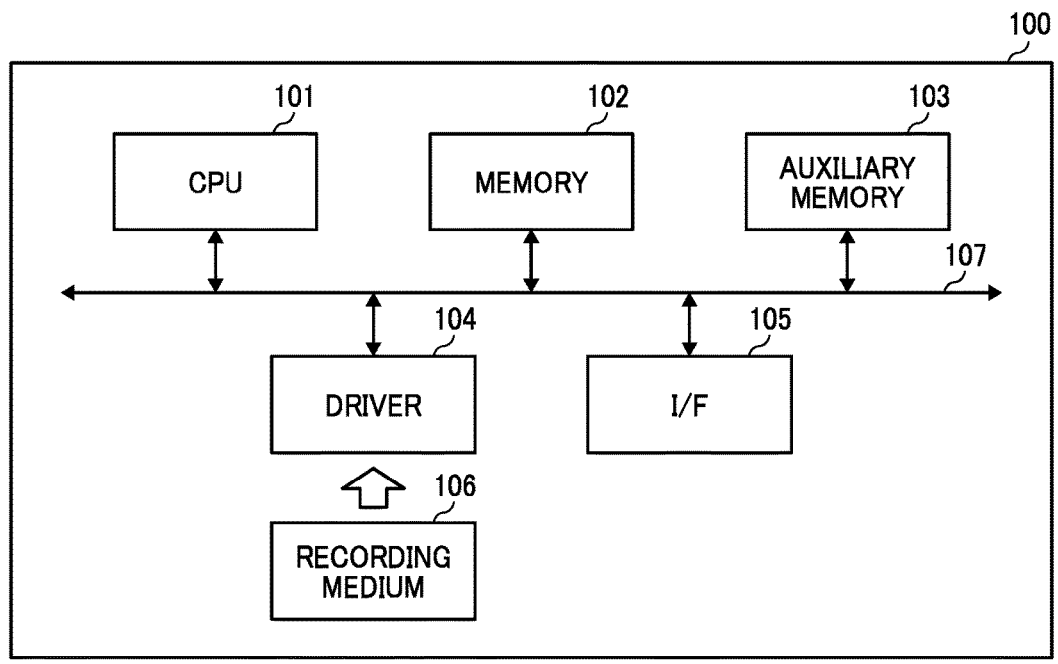
FIG. 2 is a schematic block diagram illustrating a hardware configuration of a print server according to one of the embodiments.

FIG. 2 is a diagram illustrating an example of a hardware configuration of the print server 100 according to the embodiment. The print server 100 illustrated in FIG. 2 includes a central processing unit (CPU) 101, a memory 102, an auxiliary memory 103, a driver 104, an interface (I/F) 105 which are connected to each other through a bus 107.

A functions of the print server 100 is implemented by executing a program. The program is provided with a recording medium 106 such as a compact disc read only memory (CD-ROM). When the recording medium 106 storing the program is set in the driver 104, the program is loaded to the auxiliary memory 103 from the recording medium 106 via the driver 104. The program, however, is not necessary to be loaded using the recording medium 106, and in some of the embodiments, the program is downloaded from a computer through a network. The auxiliary memory 103 also stores, for example, necessary files and data, in addition to the loaded program.

In response to an instruction to activate the program, the memory 102 reads the program from the auxiliary memory 103 and stores the read program. The CPU 101 executes the function associated with the print server 100 according to the program stored in the memory 102. The I/F 105 is used for connecting to the network.

Additionally, in some of the embodiments, each of the print servers 100 is implemented with a plurality of computers each of which has a configuration as illustrated in FIG. 2. Additionally the management server 600 may also have the same hardware configuration as the print server 100.

(Hardware Configuration of Client PC 200)

Figure 3:
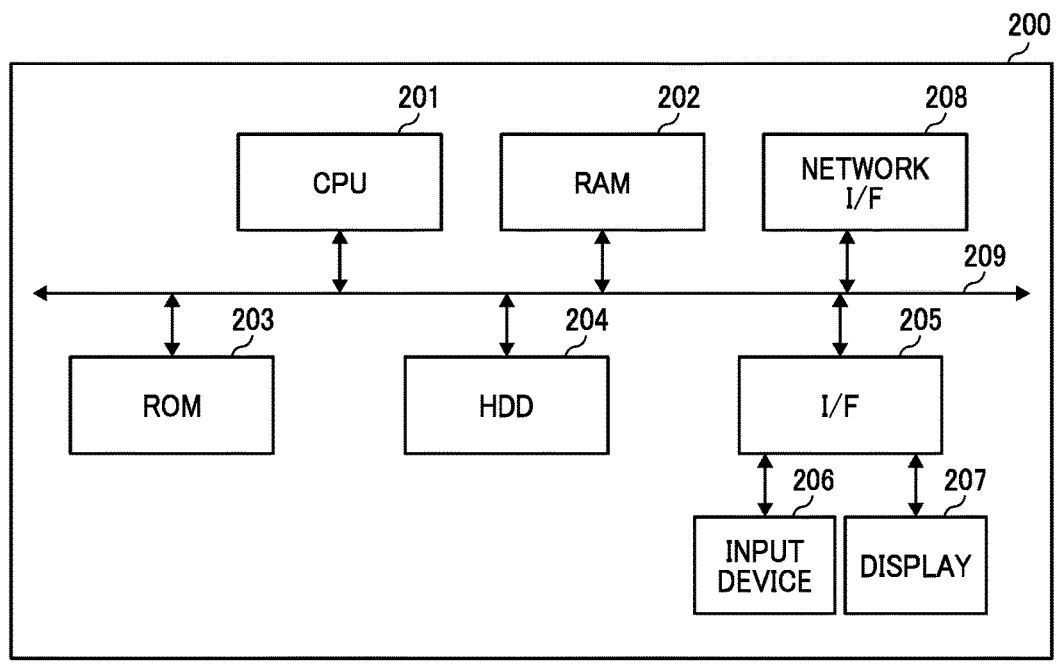
FIG. 3 is a schematic block diagram illustrating a hardware configuration of a client personal computer (PC) according to one of the embodiments.

FIG. 3 is a diagram illustrating an example of a hardware configuration of the client PC 200 according to the embodiment.

The client PC 200 includes, for example, a CPU 201, a random access memory (RAM) 202, a ROM 203, a hard disc drive (HDD) 204, an I/F 205, an input device 206, a display 207, and a network I/F 208, which are connected to each other through a bus 209. In some of the embodiments, each of the input device 206 and the display 207 is not connected, but is connected when being used.

The input device 206 includes, for example, a keyboard and a mouse, and is used by the user to input various operation signals. The display 207 displays a result of processing performed by the client PC 200.

The network I/F 208 connects the client PC 200 to the communication network 700. With this configuration, the client PC 200 performs data communication via the network I/F 208.

The HDD 204 is a nonvolatile storage device that stores programs and data. Examples of the programs and the data stored in the HDD 204 include an operating system (OS), which is basic software used for controlling overall operation of the client PC 200, and application software providing various functions on the OS.

The I/F 205 is an interface that connects to external devices. The external devices include a recording medium. With this configuration, the client PC 200 reads and writes data and programs from and to the recording medium via the I/F 205. Examples of the recording medium include a flexible disc, a compact disc (CD), a digital versatile disc (DVD), a secure digital (SD) memory card, and a universal serial bus (USB) memory.

The ROM 203 is a nonvolatile semiconductor memory (storage device) capable of storing programs and data even when a power is turned off. The ROM 203 stores a Basic Input/Output System (BIOS) executed in starting the client PC 200, an OS configuration, and programs and data for network settings, for example. The RAM 202 is a volatile semiconductor memory (storage device) that temporarily stores programs and data.

The CPU 201 reads programs and data from a storage device such as the ROM 203 and the HDD 204 onto the RAM 202, and executes processing to control the client PC 200 and implements the functions of the client PC 200.

(Hardware Configuration of MFP 300)

Figure 4:
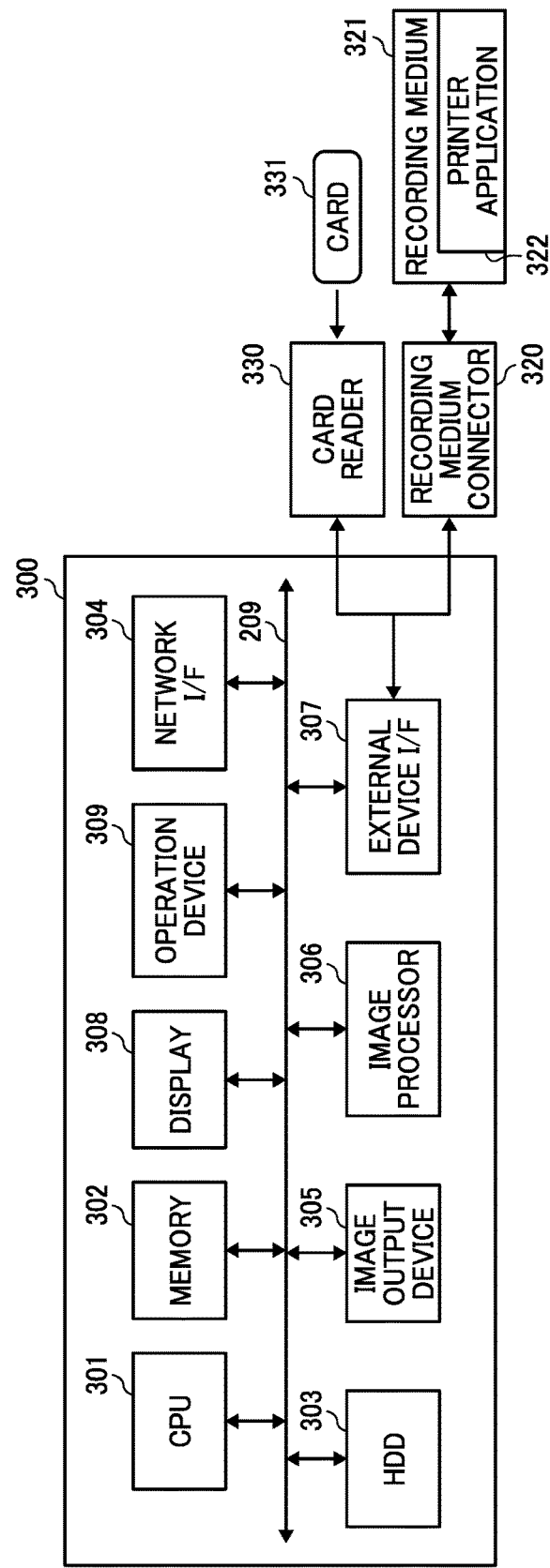
FIG. 4 is a schematic block diagram illustrating a hardware configuration of an image forming apparatus according to one of the embodiments.

FIG. 4 is a block diagram illustrating an example of a hardware configuration of the MFP 300. The MFP 300 includes a CPU 301, a memory 302, an HDD 303, which is an auxiliary storage device, a network I/F 304, an image output device 305, an image processor 306, an external device I/F 307, a display 308, and an operation device 309.

A program that implements a function of the MFP 300 is recorded (stored) in a nonvolatile auxiliary storage device such as the HDD 303. Various types of applications are installed for implementing corresponding programs, and here in the description of the embodiment, an application referred to as a printer application is used. The HDD 303 stores, for example, necessary files and data in addition to the installed program. In response to an instruction to activate the printer application, the memory 302 reads the program from the HDD 303 and stores the read program. The CPU 301 executes the functions associated with the MFP 300 according to the printer application stored in the memory 302. The network I/F 304 is used for connecting to the network.

The display 308 includes, for example, a liquid crystal display (LCD), and displays an operation screen, a message. In some embodiments, the display 308 is not mounted in the MFP 300, especially when a size of the MFP 300 is small. The operation device 309 includes a button (key), which is hardware, and receives input operation of the user. The display 308 includes a touch panel. The display 308 and the operation device 309 are integrally configured as a control panel.

The image processor 306 performs various types of image processing required when outputting (printing) the print data. The image output device 305 outputs (prints) the print data.

The external device I/F 307 is an interface for connecting with a card reader 330 used for inputting authentication information. The external device I/F 307 includes, for example, a USB port (USB host interface) and a serial boat. The card reader 330 is a card reading device that reads information from a card 331, and includes a hardware interface (for example, a USB connector or a serial interface) connectable to the external device I/F 307. In some of the embodiments, the card reader 330 is built in the MFP 300. The card reader 330 may be any one of a contact type and contactless type. The card 331 is not limited to an integrated circuit (IC) card, but any types of cards are usable as long as each type of card is able to record a card identifier (ID) (card number), which is unique to the card.

The card 331 is used for a login process for authenticating the user as an authorized user in executing a print job with the MFP 300. In performing the pull printing, the card number recorded in the card 331 is input to the MFP 300 when the user causes the card reader 330 of the MFP 300 to read the card 331. The MFP 300 transmits the card number to the authentication server 400. The authentication server 400 authenticates that the user associated with the received card number is a user who is authorized to execute the pull printing with the MFP 300, and transmits a result of the authentication to the MFP 300. The MFP 300 determines the subsequent operation based on the authentication result transmitted from the authentication server 400.

In the embodiment, the card 331 is to be distributed to each user in advance. In some of the embodiments, a single card 331 is shared by the plurality of users according to a security level required in operation. Alternatively, a number of cards 331 (a plurality of cards 331) may be associated with a single user. Additionally, the cards 331, each of which is distributed to each user, may not have to be limited to the same type. As described above, the card reader 330 is easily connectable to the MFP 300 using, for example, a USB. In some embodiments, the plurality of card readers 330, accordingly, may be simultaneously connected to the MFP 300 according to the number of types of the cards 331. With this configuration, the plurality of types of cards 331 is able to be used at the same time.

Further, a recording medium connector 320 is connected to the external device I/F 307. When the recording medium connector 320 is connected to a recording medium 321, data stored in the recording medium 321 are transmitted to the CPU 301 or the memory 302. The recording medium 321 includes, for example, a USB memory, an SD card memory, and a CD-ROM. The recording medium 321 stores a printer application 322, and the printer application 322 is distributed in a state of being stored in the recording medium 321 or distributed from a server via the network I/F 304.

Hereinafter, a description is given of a functional configuration of each of the print server 100, the client PC 200, and the management server 600.

(Functional Configuration of Print Server 100)

Figure 5:
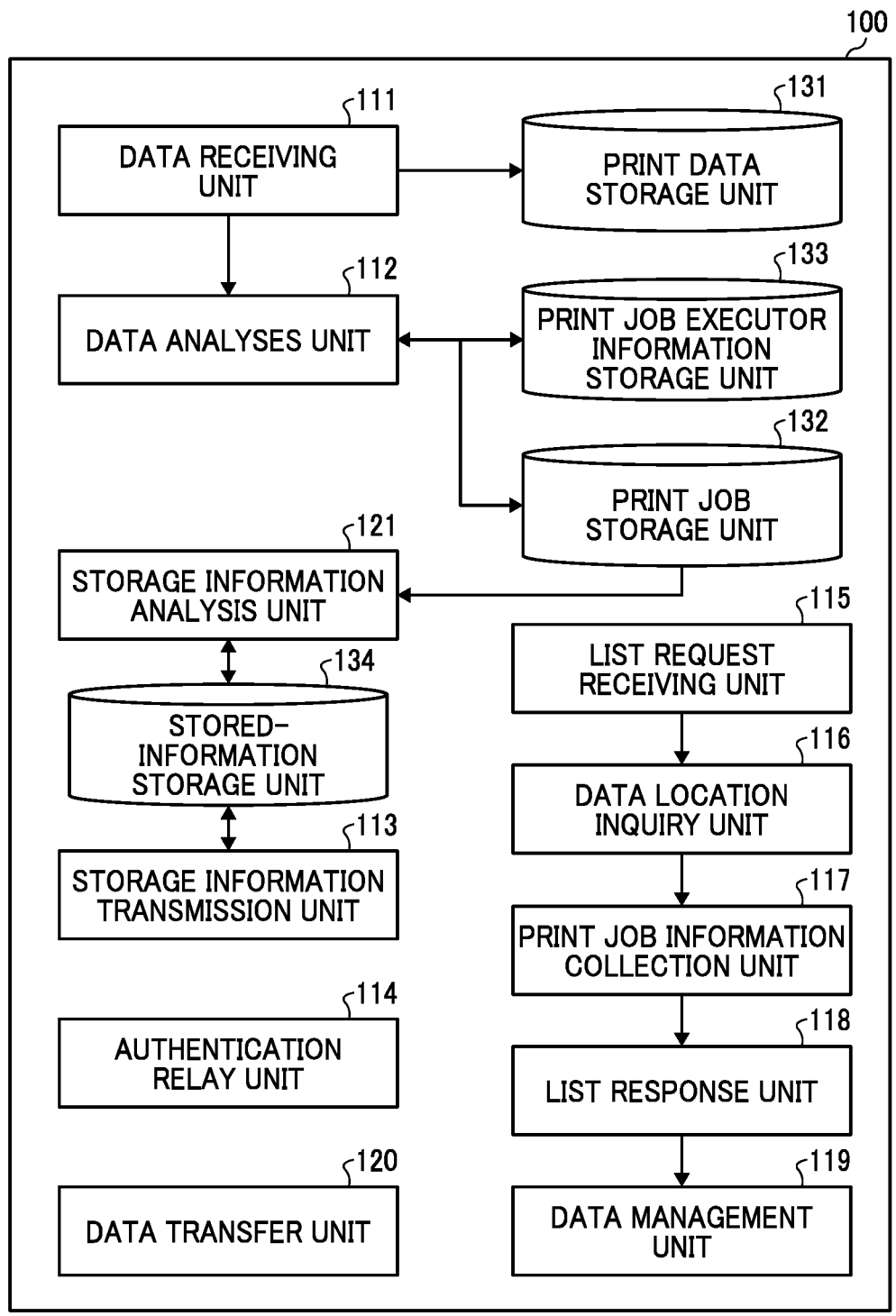
FIG. 5 is a schematic block diagram illustrating a functional configuration of the print server according to one of the embodiments.

FIG. 5 is a block diagram illustrating a functional configuration of the print server 100 according to the embodiment. The print server 100 includes, for example, a data receiving unit 111, a data analysis unit 112, a storage information transmission unit (stored-information transmission unit) 113, an authentication relay unit 114, a list request receiving unit 115, a data location inquiry unit 116, a print job information collection unit 117, a list response unit 118, a data management unit 119, a data transfer unit 120, and a storage information analysis unit 121. Each of these functional units is implemented by executing, with the CPU 101, one or more programs installed in the print server 100.

The print server 100 also includes a print data storage unit 131, a print job storage unit 132, a print job executor information storage unit 133, and a stored-information storage unit 134. Each of these storage units is implementable with, for example, the auxiliary memory 103. Alternatively, each of these storage units is implementable with a storage device connected to the print server 100 through a network. A data structure that is to be stored in each of the print data storage unit 131, the print job storage unit 132, the print job executor information storage unit 133, and the stored-information storage unit 134 is described below.

As illustrated in FIG. 9, the print data storage unit 131 stores a print data management table 901 in which each of the print job IDs, which is used for uniquely identifying corresponding print data received from the client PC 200, in the print server 100, and the corresponding print data is associated. By specifying a print job ID, the print data corresponding to the specified print job ID is read (retrieved) from the print data storage unit 131.

As illustrated in FIG. 10, the print job storage unit 132 stores a print job management table 1001 having items of print job ID, user identification information (owner user identification information), print settings information, and proxy user identification information. Each print job ID, which is associated with the corresponding print data in the print data storage unit 131, corresponding user identification information (owner user identification information) identifying an owner user (first user) who generates the print data associated with the print job ID, corresponding print settings information including various settings used to output the print data, and corresponding proxy user identification information (proxy user identification information) identifying a proxy user (second user) who is associated with the owner user identification information in advance, are associated. By specifying a print job ID, the setting information required to execute the print job and the user(s) (i.e., owner user and/or owner user and proxy user) who has (have) an authority to execute the print job are identified from the print job storage unit 132.

Because the owner user is an owner of the print data generated by himself or herself, the owner user has an authority to delete the same print data. The owner user identification information is represented as an owner identification (ID). The owner user logs in the print server 100 with the owner ID when deleting the print data, which is generated by himself or herself, from the stored print data.

As illustrated in FIG. 11, the print job executor information storage unit 133 stores a proxy settings table 1101 having items of owner user identification information and proxy user identification information, which are associated with each other. The proxy settings table 1101 is used for managing an owner user and a corresponding proxy user associated with the owner user. The owner user identification information for a single owner (first user) may be associated with the proxy user identification corresponding to two or more proxy users (second users). In such a case, the two or more users have an authority to execute a single print job.

Additionally, the proxy settings table 1101 stored in the print job executor information storage unit 133 is equal (corresponds) to print job executor information set in the management server 600. The management server 600 distributes the print job executor information to all of the print servers 100 when the print job executor information is newly set. Each print server 100 stores the print job executor information distributed from the management server 600 in the print job executor information storage unit 133 as the proxy settings table 1101.

As illustrated in FIG. 12, the stored-information storage unit 134 stores a storage information table 1201 having items of user identification information (owner identification information), proxy user identification information, and the number of jobs. Each user identification information is stored in the print job storage unit 132, and the number of jobs are associated for each user identification information and/or a combination of the user identification information and the proxy user identification information. By referring to the stored-information storage unit 134, presence of a print job associated with each user and each proxy user is specified in the print jobs stored in the print server 100.

The data receiving unit 111 receives a "print job" transmitted from the client PC 200. The data receiving unit 111 stores print data included in the print job received from the client PC 200 and a print job ID associated with the print data in the print data storage unit 131.

The data analysis unit 112 analyzes the print job received by the data receiving unit 111, specifies the user identification information identifying a user who generates the print job from the bibliographic information included in the print settings information of the print job, and generates the print job management information based on the user identification information and the print settings information. The data analysis unit 112 also stores the generated print job management information in the print job storage unit 132 associated with the print job ID.

The data analysis unit 112 also determines whether a proxy user is set in relation to user identification information associated with the print job received by the data receiving unit 111 by referring the print job executor information storage unit 133. As illustrated in FIG. 11, when the user identification information is "a0", no proxy user is set. In this case, as to a record of the print job, the data analysis unit 112 sets "blank" for a field of the proxy user identification information in the print job management table 1001 stored in the print job storage unit 132. When the user identification information is "a1", the data analysis unit 112 adds "a3", as a proxy user, to a field of the proxy user identification information corresponding to a record of the print job in the print job management table 1001 stored in the print job storage unit 132.

As described above, the data analysis unit 112 specifies the proxy user (second user), set in advance, based on the user identification information included in the print job. The specified proxy user is managed in the print job management information, by associating the specified proxy user with another information such as information of the owner user (first user). As illustrated in FIG. 10, the user, "a3", is also able to execute a print job identified with the print job ID of "J2" among the print jobs stored in the print job management table 1001, in addition to the user, "a1", who is the owner of the print job.

When a print job is newly stored in the print job storage unit 132 or when a print job is executed, the storage information analysis unit 121 updates the user identification information stored in the print job management table 1001 and the storage information table 1201 including combinations of the user identification information and the proxy user identification information.

The storage information transmission unit (stored-information transmission unit) 113 monitors the storage information table 1201, and transmits the updated storage (stored) information to the management server 600 at a time of updating the "user identification information" or the "combination of the user identification information and the proxy user identification information" in the storage information table 1201. Updating of the storage information table 1201 includes, for example, newly adding the user identification information or the combination of the user identification information and the proxy user identification information, and deleting the user identification information or the combination of the user identification information and the proxy user identification information, from the storage (stored) information. The storage information transmission unit (stored-information transmission unit) 113, accordingly, also transmits the storage information to the management server 600 when the number of jobs corresponding to the "user identification information" or the "combination of the user identification information and the proxy user identification information", which is deleted from the storage information table 1201, becomes "zero".

That is, the storage information reported from the storage information transmission unit (stored-information transmission unit) 113 to the management server 600 is information that indicates a presence of the "user identification information" or the "proxy user identification information" associated with the print job being stored in the print server 100.

The storage information transmission unit (stored-information transmission unit) 113 informs the management server 600 of the storage information when a print job is newly stored in the print server 100, however, as described above, the stored information is not always informed to the management server 600 from the print server 100. When a field of the number of jobs stored in the storage information table 1201 is updated according to the user identification information or the combination of the user identification information and the proxy user identification information which are already stored in the storage information table 1201, the storage information transmission unit (stored-information transmission unit) 113 does not inform the management server 600 of the updated number of jobs.

The data transfer unit 120 transfers "storage information" transmitted from the client PC 200 to the management server 600. A detailed description of the storage information of a client side is deferred. In the following description, when the storage information of the client side is not distinguished from the storage information of a server side, a terminology of "storage information" is used.

When a user attempts to log in the MFP 300, the authentication relay unit 114 receives an authentication request from the MFP 300, and then transfers the authentication request to the authentication server 400. Then, the authentication relay unit 114 transfers a response for the authentication request from the authentication server 400 to the MFP 300. Information stored in the authentication server 400 may be cached in each print server 100. In this case, the authentication relay unit 114 performs an authentication process based on the cached information. As an example of information used for the user authentication, a card ID of the IC card associated with the user identification information is used. As another example of the information used for the user authentication, a combination of the user identification information and a password or a combination of the user identification information and biometric information of the user is used.

The list request receiving unit 115 receives from the MFP 300 an acquisition request for a list of print jobs, or a print job list, related to a login user of the MFP 300. The data location inquiry unit 116 transmits an inquiry to the management server 600 for a storage source storing print job information corresponding to the user in association with the acquisition request for the print job list. Accordingly, the management server 600 replies a location(s) of the print server 100 and the client PC 200 each of which stores the print job information inquired from the MFP 300, by checking the storage information related to each print server 100 and each client PC 200.

The print job information collection unit 117 collects the print job information corresponding to the user identification information in association with the acquisition request for the print job list, from the print server 100 or other print servers 100, based on a result of the inquiry performed by the data location inquiry unit 116. The list response unit 118 transmits the print job list collected by the print job information collection unit 117 to the MFP 300, which is a transmission source of the acquisition request for the print job list. The data location inquiry unit 116 and the print job information collection unit 117 collectively configure a print job list generating unit for generating print job list information (print job list) and sending the print job list information to the MFP 300.

The data management unit 119 obtains a print job from the print job management table 1001 in response to an acquisition request for print job information representing the print job that is selected form the print job list, and obtains the print data from the print data management table 901. The data management unit 119 transmits the obtained print data to the MFP 300, which is the transmission source of the acquisition request.

(Functional Configuration of Client PC 200)

Figure 6:
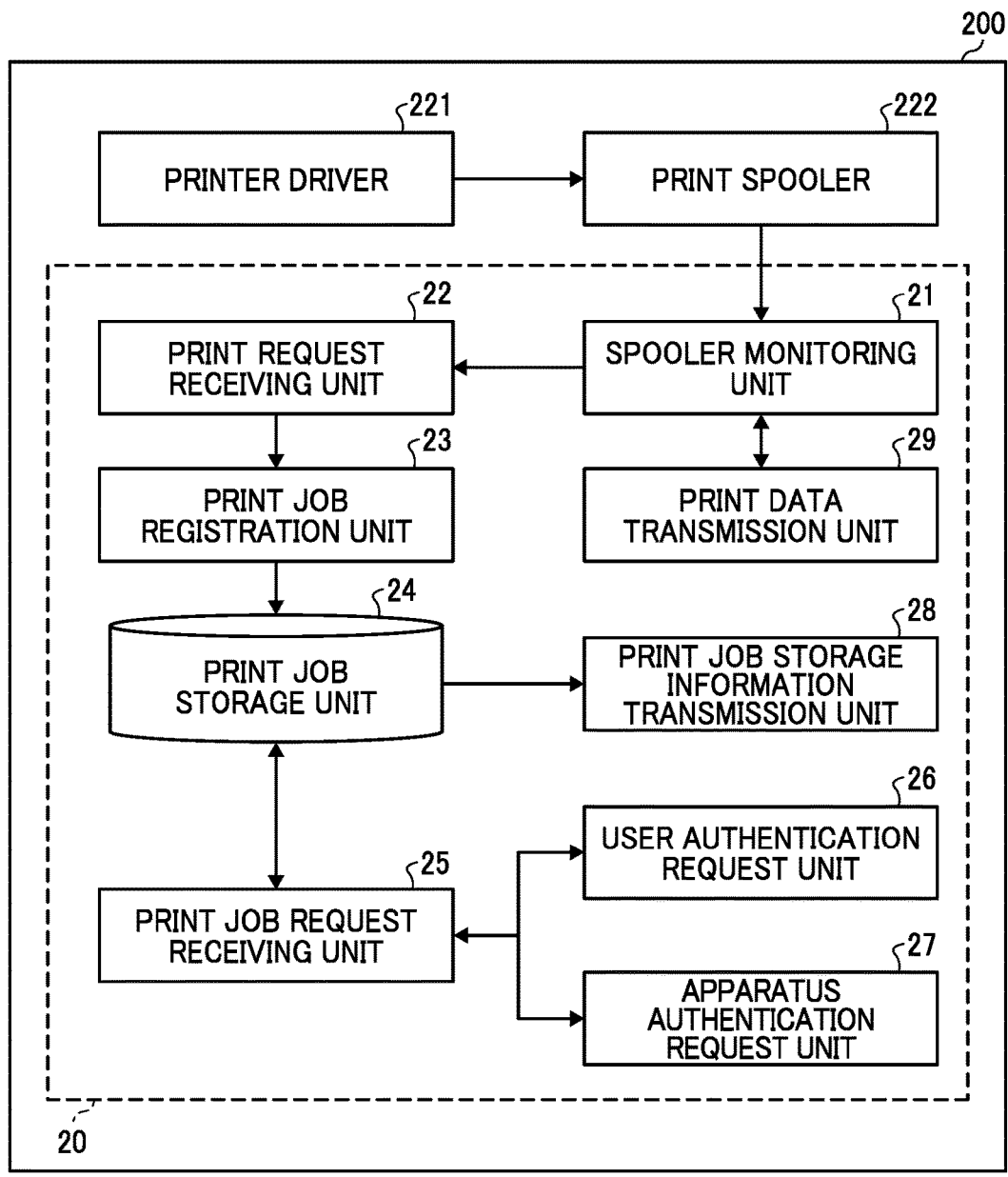
FIG. 6 is a schematic block diagram illustrating a functional configuration of the client PC according to one of the embodiments.

FIG. 6 is a schematic block diagram illustrating one example of a functional configuration of the client PC 200. The client PC 200 includes, for example, a spooler monitoring unit 21, a print request receiving unit 22, a print job registration unit 23, a print job storage unit 24, a print job request receiving unit 25, a user authentication request unit 26, an apparatus authentication request unit 27, a print job storage information transmission unit (stored-information transmission unit) 28, and a print data transmission unit 29.

A printer driver 221 and a print spooler 222 are not parts of a client application 20. The print spooler 222 is accompanied to the operating system (OS) used with the client PC 200, and the printer driver 221 is separately provided according to an environment where the client PC 200 is used.

The spooler monitoring unit 21 monitors storage (storing operation) of print jobs from the printer driver 221 to the print spooler 222. The spooler monitoring unit 21 refers to a parameter of print data stored along with the print jobs, and transfers the print data to the print request receiving unit 22 when determining that the print data is to be stored in the client PC 200. "The print data being to be stored in the client PC 200" is target data of the pull printing and a storage source of "the print data" is not the print server 100. If the storage source of the print data is to be the print server 100, the print data is transferred to the print data transmission unit 29, even when the print data is the target data of the pull printing.

The print data transmission unit 29 transmits the print data transferred from the spooler monitoring unit 21 to the print server 100 set as a data/information reference destination in advance. The print data is received by the data receiving unit 111 of the print server 100, as described above.

The print request receiving unit 22 is called by the spooler monitoring unit 21. The print request receiving unit 22 receives the print data from the spooler monitoring unit 21, and transfers the print data to the print job registration unit 23 for the pull printing.

The print job registration unit 23 adds information such as the user identification information, which uniquely identifies the user who generates the print data, to the print data received from the print request receiving unit 22, and transfers the print data to the print job storage unit 24.

The print job storage unit 24 receives the print data from the print job registration unit 23 and stores print data management information in which the print job ID, which is identification information for uniquely identifying the print data, and the print data are associated. The print data management information has the same configuration as the print data management table 901 illustrated in FIG. 9, which is described above.

The print job storage unit 24 also stores print job management data. The print job management data has the same configuration as the print job management table 1001 described with reference to FIG. 10. The print job management data includes, for example, a print job ID, user identification information (owner user identification information) for identifying an owner user (first user) who generates print data associated with the print job ID, print settings information including various settings used to output the print data, and another user identification information (proxy user identification information) for identifying a proxy user (second user) who is authorized to execute proxy printing and associated with the owner user identification information in advance.

The print job request receiving unit 25 receives a print job request from the MFP 300 and requests the user authentication request unit 26 to check the authentication information of the user and the apparatus authentication request unit 27 to check the authentication information of the apparatus. If the authentication is valid, the print job request receiving unit 25 requests for the print job to the print job storage unit 24, and transmits the print data to the MFP 300, which is the request source, which requests the print job.

The print job storage information transmission unit (stored-information transmission unit) 28 generates storage information in which client PC information (e.g., client ID, an internet protocol (IP) address) is associated with the print job management data stored in the print job storage unit 24, and transmits the generated storage information to the print server 100. The print server 100 transfers the storage information transmitted from the client PC 200 to the management server 600. The management server 600 stores the storage information in association with the client PC 200 transferred from the print server 100 as "client side location information". A detailed description of this process, storing the storage information, is deferred.

A data structure of the print management data stored in the print job storage unit 24, or stored in the client PC 200 is the same as that stored in the print data storage unit 131 of the print server 100 (see FIG. 9). Similarly, the print job management data has the same configuration as the data stored in the print job storage unit 132 of the print server 100 (see FIG. 10), and the storage information has the same configuration as the data stored in the stored-information storage unit 134 of the print server 100 (see FIG. 12). With this configuration, the MFP 300 is able to request for the print job stored in the client PC 200.

(Functional Configuration of MFP 300)

Figure 7:
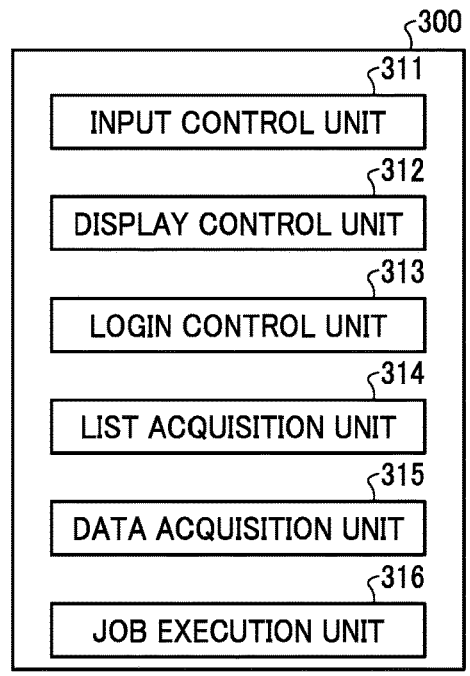
FIG. 7 is a schematic block diagram illustrating a functional configuration of the image forming apparatus according to one of the embodiments.

FIG. 7 is an example of a functional block diagram of the MFP 300. The MFP 300 includes, for example, an input control unit 311, a display control unit 312, a login control unit 313, a list acquisition unit 314, a data acquisition unit 315, and a job execution unit 316. Each of these functional units is implemented by executing, with the CPU 301 of the MFP 300, one or more programs installed in the MFP 300.

The input control unit 311 interprets a user's instruction input via the control panel of the MFP 300, for example. The display control unit 312 causes the control panel to display information generated in processing operation performed with the MFP 300. The login control unit 313 controls login processing of a user who is to log in the MFP 300.

The list acquisition unit 314 requests for a list of print job information associated with the login user (print job list) to the print server 100 set as a data/information reference destination in the MFP 300.

The data acquisition unit 315 acquires print data associated with the print job information selected by the user from the print job list displayed on the control panel, from the print server 100 or the client PC 200. The print job information includes address information indicating a storage destination of the print data related to the print job information. The data acquisition unit 315 acquires the print data based on the address information. The print data is data that is used for drawing a print image in the print job, for example, data in a page description language (PDF) format. Generally, an amount of data of the print data is greater than that of the print job information. Accordingly, in the embodiment, the print data selected as a print target is downloaded to the MFP 300. However, in addition to the print job list, the print data related to each print job information included in the print job list may be distributed on the network.

The job execution unit 316 controls printing of the print data acquired by the data acquisition unit 315. The job execution unit 316 executes print output based on the acquired print data.

(Functional Configuration of Management Server 600)

Figure 8:
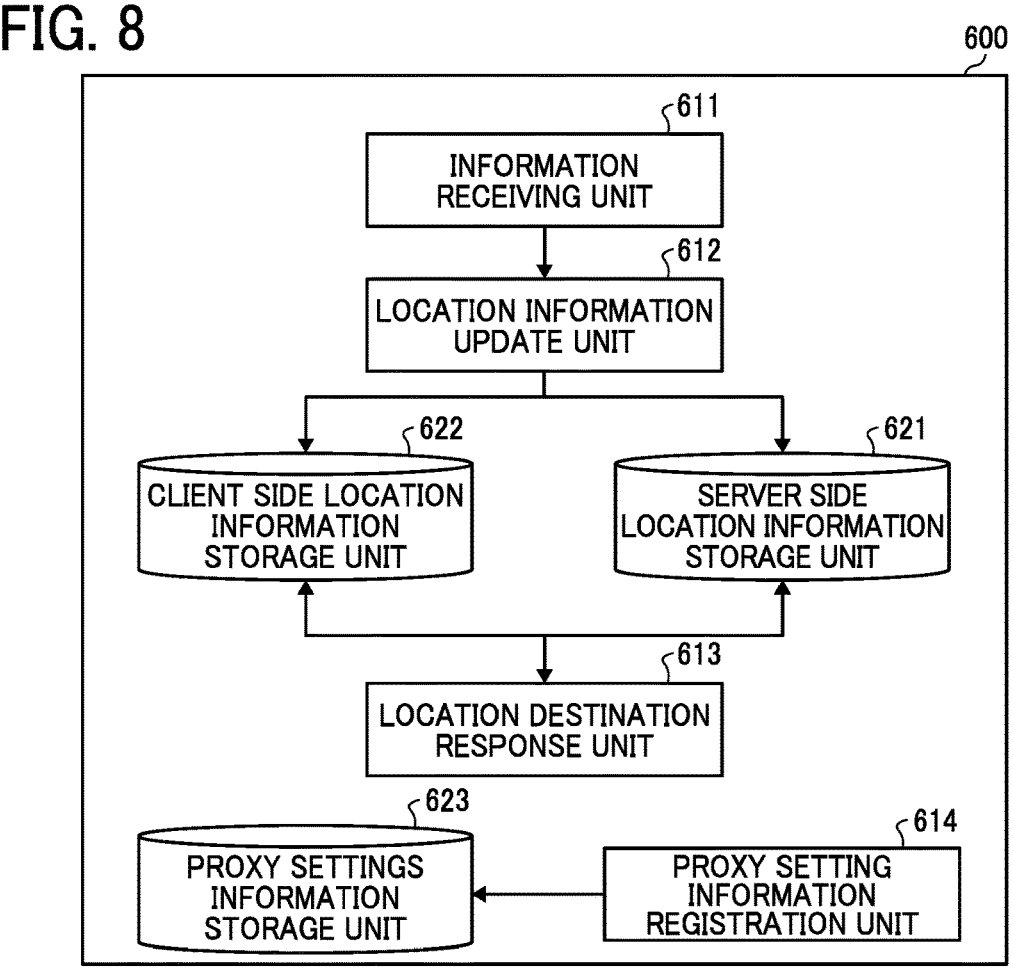
FIG. 8 is a schematic block diagram illustrating a functional configuration of a management server according to one of the embodiments.

FIG. 8 is a schematic block diagram illustrating a functional configuration of the management server 600. In the description of the embodiment, the hardware configuration of the management server 600 is substantially the same as the print server 100 illustrated in FIG. 2, and FIG. 2 is also used as a diagram illustrating the hardware configuration of the management server 600. The management server 600 includes, for example, an information receiving unit 611, a location information update unit 612, a location destination response unit 613, and a proxy settings information registration unit 614. Each of these functional units is implemented by executing, with the CPU 101 of the management server 600, one or more programs installed in the management server 600.

The management server 600 also includes a server side location information storage unit 621, a client side location information storage unit 622, and a proxy settings information storage unit 623. Each of these storage units is implementable with, for example, the auxiliary memory 103 included in the management server 600. Alternatively, each of these storage units is implementable with a storage device connected to the management server 600 through a network.

Figures 13, 14:
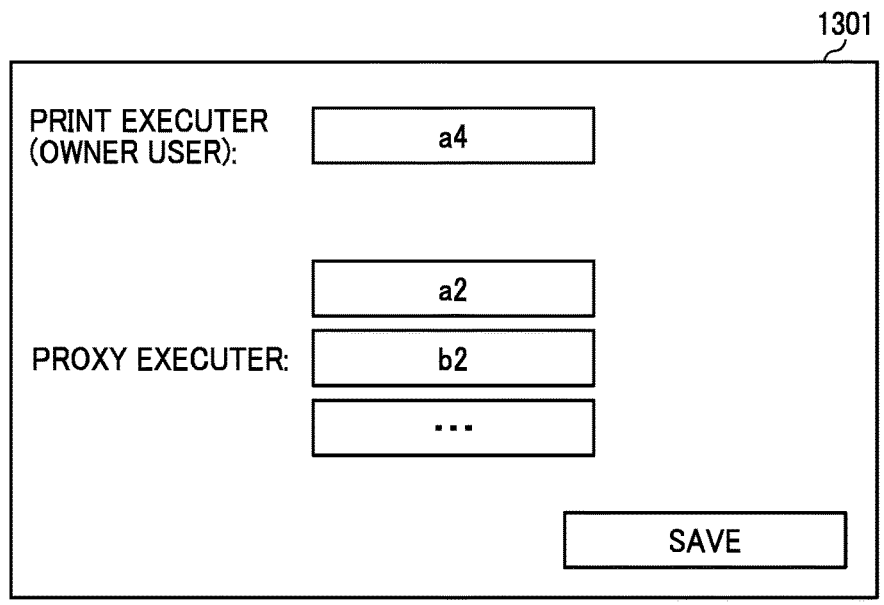
FIG. 13 is an illustration of one example of a screen for proxy settings according to one of the embodiments.
FIG. 14 is a table illustrating one example of a data structure of a server side location information table according to one of the embodiments.

The proxy settings information registration unit 614 receives registration of proxy settings, using a display and an input device such as a keyboard and a mouse connected via the I/F device 105, which is illustrated in FIG. 2, of the management server 600. FIG. 13 is an illustration of a proxy setting screen 1301 displayed on the display. As illustrated in the proxy setting screen 1301, user identification information of a user who is an owner user is entered in a field of "print owner user", user identification information of a user who is a proxy user is entered in a field of "proxy executor", and then a "SAVE" button is clicked. Through this, the settings of the proxy user for each owner user are stored in the proxy setting information storage unit 623. A configuration of the data stored in the proxy setting information storage unit 623 is substantially the same as that of the proxy settings table 1101 illustrated in FIG. 11.

The management server 600 stores user identification information corresponding to a user and apparatus identification information that corresponds to one or more apparatus IDs in a manner that the user identification information and each apparatus ID are associated with each other. The apparatus ID uniquely identifies an apparatus that stores the print job registered as being associated with the user identification information corresponding to the user as an owner user or a proxy user. The apparatus ID is a "server ID" when the storage destination of the print job is the print server 100, and a "client ID or IP address" when the storage destination is the client PC 200. The storage information on the print job stored in the print server 100 is stored in the server side location information storage unit 621, and the storage information on the print job stored in the client PC 200 is stored in the client side location information storage unit 622.

The information receiving unit 611 receives the storage information (server side storage information) transmitted from the storage information transmission unit (stored-information transmission unit) 113 of each print server 100 and the storage information (client side storage information) transferred by the data transfer unit 120.

The location information update unit 612 updates the server side location information stored in the server side location information storage unit 621 with the storage information received from the print server 100. The location information update unit 612 also updates the client side location information stored in the client side location information storage unit 622 with the storage information transmitted from the client PC 200 to the print server 100 and transferred from the print server 100.

The server side location information storage unit 621 stores the print job information corresponding to a user associated with the user identification information, and the server ID of the print server 100, which is a storage destination of the print data. FIG. 14 illustrates an example of a table having a data structure of data stored in the server side location information storage unit 621.

As illustrated in FIG. 14, the server side location information storage unit 621 stores a server side location information table 1401 including items of server ID, user identification information, and proxy user identification information. In the server side location information table 1401, the server ID uniquely identifying the print server 100, and a combination of the user identification information and the proxy user indemnification information each of which is associated with a print job stored in the print server 100 are associated with each other.

The client side location information storage unit 622 stores print job information corresponding to a user associated with the user identification information and a client ID of the client PC 200, which is a storage destination of the print data. FIG. 15 is a table illustrating one example of a data structure of data stored in the client side location information storage unit 622.

As illustrated in FIG. 15, the client side location information storage unit 622 stores a client side location information table 1501 including items of client ID which is identification information for uniquely identifying the client PC 200, an IP address indicating a location of the client PC 200, and combination of the user identification information and the proxy user identification information related to the print job stored in the client PC 200.

In response to an inquiry request from the data location inquiry unit 116 of each print server 100, the location destination response unit 613 transmits a list of server IDs stored in the server side location information storage unit 621. Each of the server IDs is associated with the user identification information included in the inquiry request, That is, the location destination response unit 613 serves as a list transmission unit. Additionally, in response to the inquiry request from the data location inquiry unit 116 of each print server 100, the location destination response unit 613 transmits a list of client IDs stored in the client side location information storage unit 622. Each of the client IDs included in the list is associated with the user identification information included in the inquiry request.

The print server 100 that receives a request for a print job list from the MFP 300 refers to the server side location information storage unit 621. Through this, information of all of the print servers 100 each of which stores the print job associated with the user identification information of the request source is obtained. The information on the print jobs associated with the user identification information is requested to each of the print servers 100 corresponding to the information of the print servers 100 obtained as described above, and the acquired information is sent to the MFP 300 as a response.

This allows a user to utilize the information on a location of a print job centrally managed by the management server 600, and request the execution of the printing of the print job from the MFP 300 located at any one of the sites, and this also allows the proxy user who is authorized by the owner user to perform the printing of the print job from any one of the sites, namely without limitation of the sites.

(Proxy Printing/Server Storage)

Hereinafter, a description is given of a control program according to one of the embodiments. The program according to the embodiment is used for executing the functions of the information processing apparatus and the printing system according to the embodiments described above. The program is described with reference to sequence diagrams of FIG. 16, FIG. 17, and FIG. 18.

(Print Job Storage Process: Client Side)

A process of requesting for newly storing a print job in the client PC 200, namely processing of a storage request, in the pull printing, is described.

Figure 16:
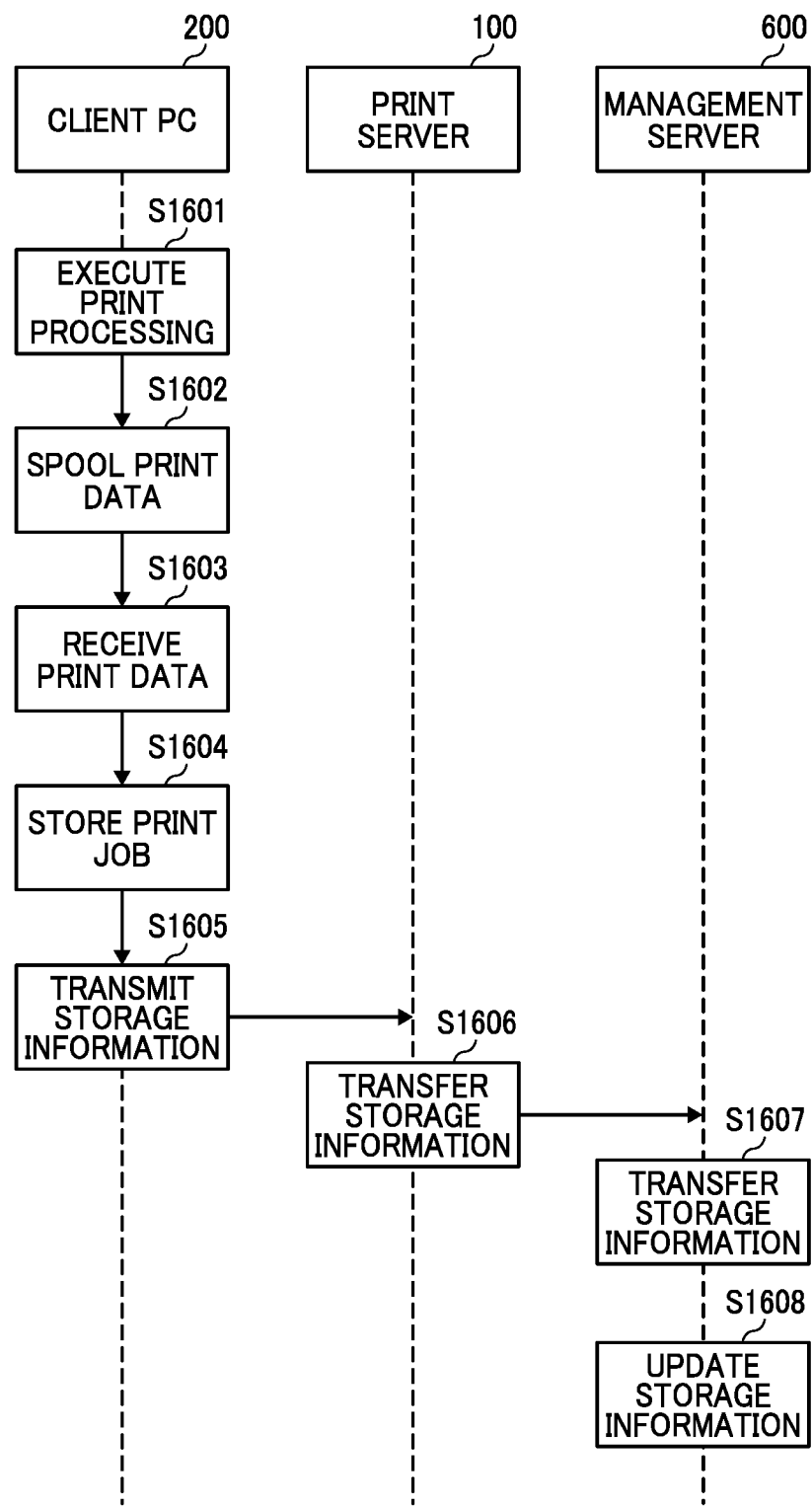
FIG. 16 is a sequence diagram illustrating one example of a process of proxy printing using a control program according to one of the embodiments.
Figure 17:
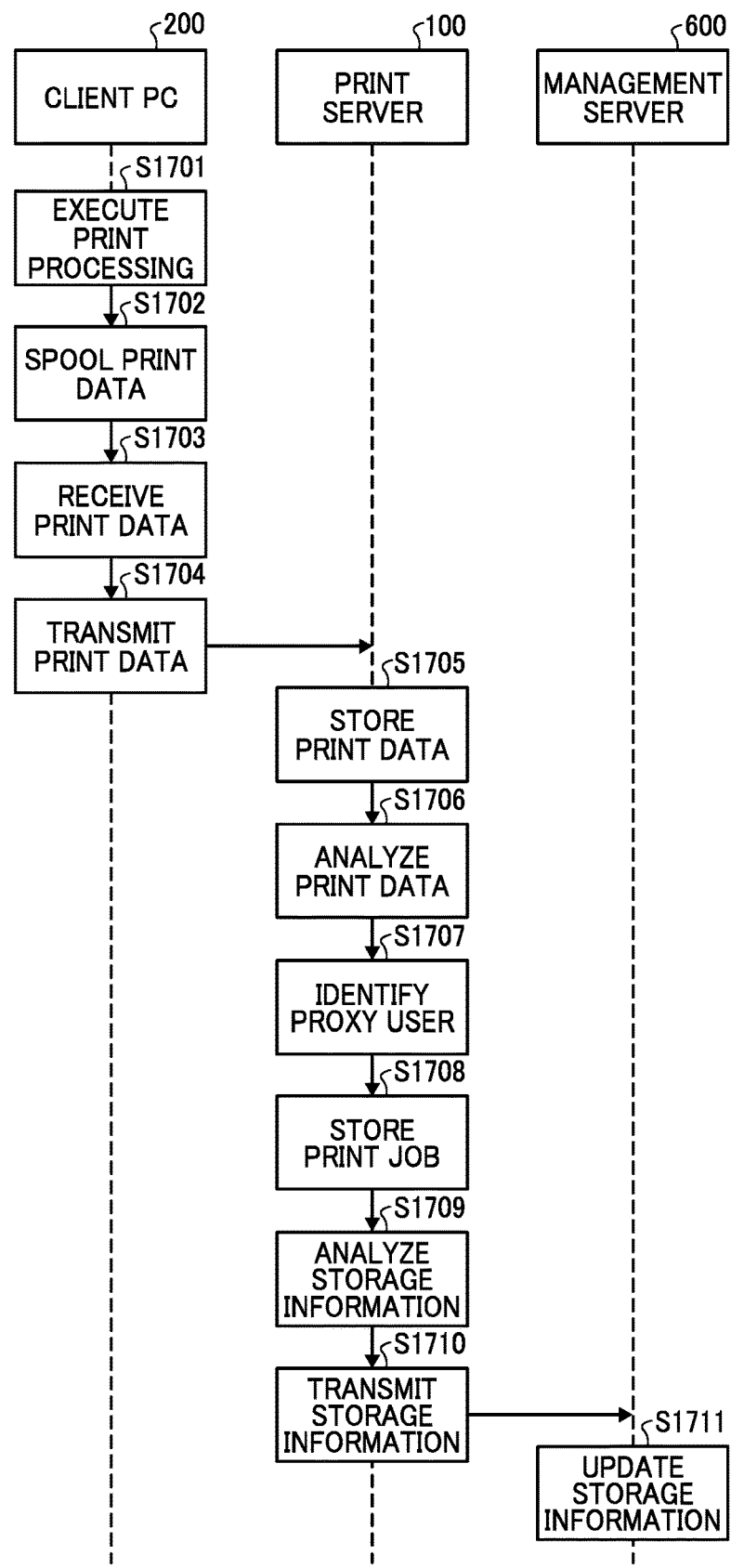
FIG. 17 is a sequence diagram illustrating another example of a process of proxy printing using a control program according to one of the embodiments.

First, as illustrated in FIG. 16, a user operates a "print menu" such as document creation software of the client PC 200 to perform printing (S1601). The processing of the storage request is performed according to contents in printer settings of the client PC 200, which are appropriately selected in a printer settings according to user operation. For example, "normal print", "store in the print server 100", and "store in the client PC 200", are settable in the settings of a print port in the client application 20 of the client PC 200. A description is given of a case of selecting "store in the client PC 200" at S1601. In some of the embodiments, settings for different print ports may be set as a "specific printer" to be distinguished from the others and when printing is performed, the printer is to be designated with a printer name.

When data is transferred from the document printing software to the printer driver 221, the printer driver 221 generates print data, transfers the print data to the print spooler 222, and the print spooler 222 stores the print data (S1602). The steps in the process described above are a normal processing operation in the print processing performed in the client PC 200.

The spooler monitoring unit 21 constantly monitors registration of the print data in the print spooler 222. When the print data is registered at S1602, the spooler monitoring unit 21 receives the print data from the print spooler 222 and transmits the print data to the print request receiving unit 22 (S1603).

The print request receiving unit 22 transfers the print data received from the spooler monitoring unit 21 to the print job registration unit 23, and the print job registration unit 23 stores the received print data in the print job storage unit 24 (S1604). In S1604, a user name (user identification information of a user who is the owner) related to the print data, bibliographic information such as a job name, and print settings information such as the number of copies are added to the print data to be stored.

Subsequently, when the print job is stored in S1604, the print job storage information transmission unit (stored-information transmission unit) 28 transmits storage information including the combination of the user identification information and the proxy user identification information related to the print job and the client ID or the IP address to the print server 100 (S1605).

Subsequently, the data transfer unit 120 of the print server 100 transfers the storage information transmitted from the client PC 200, which is the transmission source, in S1606 to the management server 600 as client side management information (S 1606).

The management server 600 receives the storage information transmitted from the client PC 200 via the print server 100 with the information receiving unit 611, and the information receiving unit 611 transfers the storage information to the location information update unit 612 (S1607).

The location information update unit 612 updates the client side location information stored in the client side location information storage unit 622 based on the storage information received from the location information update unit 612 (S1608). As illustrated in FIG. 15, the client side location information includes, for example, the client ID and the user identification information and the proxy user identification information related to the print job stored in the client PC 200. Instead of the client ID, the IP address of the client PC 200 may be stored.

As described above, when the print data is stored in the client PC 200, the management server 600 centrally manages the storage information including user identification information identifying the user who generates the print data (owner user), user identification information identifying the user set as a proxy user. This allows any one of the user or the proxy user to execute the print job from any one of the MFPs 300, each of which locates in different sites. A detailed description of this is described later.

(Print Job Storage process: Server Side)

A process of newly storing a print job for the pull printing in the print server 100 is described below.

First, a user instructs printing using a "print menu" such as document creation software of the client PC 200 (S1701). In setting the printer settings of the client PC 200, when the user appropriately selects a print port to which the client application 20 is set, one of "normal printing", "store in the print server 100", and "store in the client PC 200" is selectable. A description is given of a case where "store in print server 100" is selected in S1701.

When data is transferred from the document printing software to the printer driver 221, the printer driver 221 generates print data, transfers the print data to the print spooler 222, and the print spooler 222 stores the print data on the spool (S1702). The steps in the process described above are a normal processing operation in the print processing performed by the client PC 200.

The spooler monitoring unit 21 constantly monitors registration of the print data on the spool. When the print data is registered in S1702, the spooler monitoring unit 21 receives the print data from the print spooler 222 and transfers the print data to the print data transmission unit 29 (S1703).

The print data transmission unit 29 transmits the print data received from the spooler monitoring unit 21 to the print server 100 (S1704). The data receiving unit 111 of the print server 100 stores the received print data in the print data storage unit 131 (S1705).

Further, the data analysis unit 112 analyzes the print data received by the data receiving unit 111 of the print server 100 (S1706). The print job executor information storage unit 133 is referred based on user identification information extracted in analysis of S1706, and proxy user identification information is specified (S1707).

The print job information is created by associating the proxy user identified in S1706, and then stored in the print job storage unit 132 (S1708).

Subsequently, the storage information analysis unit 121 analyzes the print job stored in the stored-information storage unit 134, and determines whether the user identification information associated with the newly stored print job and a combination of the user identification information and the proxy user identification information are stored in the stored-information storage unit 134 (S1709). If the storage information analysis unit 121 determines the above-mentioned information is already stored in S1709, the storage information analysis unit 121 adds to a corresponding field of the number of jobs in the storage information table 1201 illustrated in FIG. 12. If the storage information analysis unit 121 determines that the above-mentioned information is not stored, according to the analysis of S1709, new storage information associated with the combination is transmitted to the management server 600 (S1710). The storage information analysis unit 121 serves as a storage information generating unit.

The management server 600 receives the storage information transmitted from the print server 100 at the information receiving unit 611, transfers the storage information to the location information update unit 612 to store the server side location information, and updates the server side location information in the server side location information storage unit 621 (S1711). As illustrated in FIG. 14, the server side location information includes a server ID for identifying the print server 100 that is a transmission source, and a combination of the user identification information and the proxy user identification information related to the print data.

As described above, when the print data is stored in the print server 100, the management server 600 centrally manages the storage information including the user who generates the print data (owner user), the user set as a proxy user for the owner user, and the user identification information corresponding to the owner user and the user identification information corresponding to the proxy user. This allows any one of the user and the proxy user to execute the print job from any one of the MFPs 300, each of which locates in a different site. A detailed description of this is described later.

(Print Job Execution Process: Owner User)

A process of executing a print job for the pull printing according to the embodiment is described below with reference to FIG. 18. First, a user places an IC card (card 331 of FIG. 4) over the MFP 300 and executes a login process (S1801). In S1801, the login control unit 313 executes inquiry processing, namely sends an inquiry for authentication to the authentication server 400 using a card ID of the IC card, and operates the MFP 300 by assuming that the user is an authorized user whose card ID is registered.

Subsequently, the MFP 300, which completes the login process, transmits the user identification information specified in the login process of S1081 from the list acquisition unit 314 to the print server 100 that is set as a data/information reference destination, and requests for a print job list that is associated with the user, namely sends a print job list acquisition request. (S1802).

The data location inquiry unit 116 of the print server 100 transmits an inquiry to the management server 600 for storage destinations of the print job information related to the user associated with the print job list acquisition request, based on the user identification information received from the MFP 300 in S1802 (S1803).

The location destination response unit 613 of the management server 600 refers to the storage information stored in each of the server side location information storage unit 621 and the client side location information storage unit 622 based on the user identification information to be referred (S1804). The location destination response unit 613 identifies the print server(s) 100 and the client PC(s) 200, storing the print job information in association with the user identification information, based on the storage information stored in each of the server side location information storage unit 621 and the client side location information storage unit 622. Subsequently, a list of the identified print server(s) 100 and the client PC(s) 200, namely a list of apparatuses, is transmitted to the print server 100 (S1805).

Subsequently, based on the storage information, namely the list of the print server(s) 100 and the client PC 200(s), received from the management server 600, the print job information collection unit 117 obtains a print job list associated with the user identification information of the inquiry source (S1806). The print jobs included in the print job list are obtained from the own print server 100, the other print servers 100, and the client PC 200. The storage information includes, as described above, the user identification information of the owner user and the combination information of the owner user and the proxy user. In S1806, the print job list associated with the owner user is obtained, and then the print job list associated with the proxy user is obtained.

Subsequently, the list response unit 118 of the print server 100 transmits the print job list obtained in S1806 to the MFP 300 (S1807).

Figure 19:
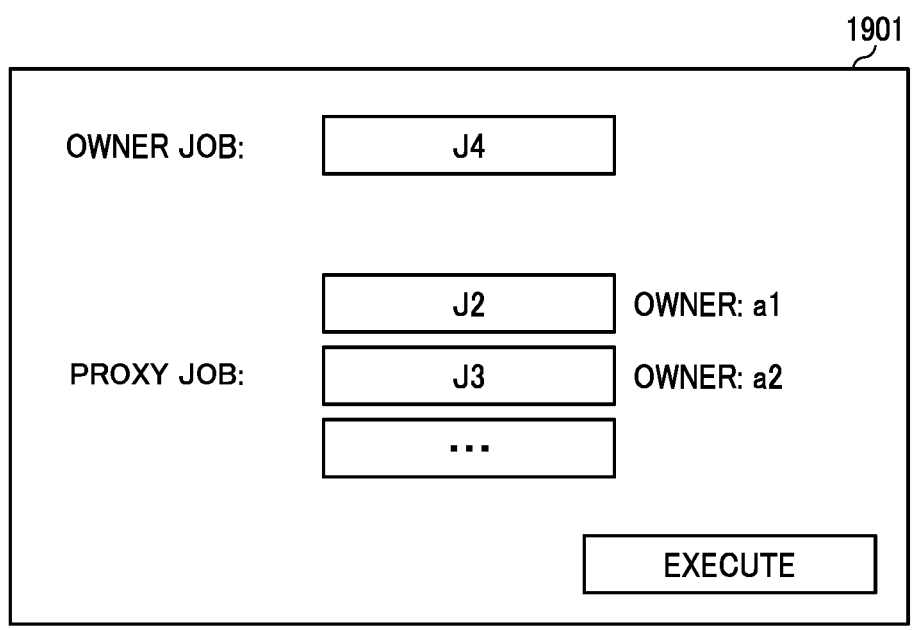
FIG. 19 is an illustration of one example of a screen displaying a print job list, according to one of the embodiments.

Subsequently, the MFP 300 displays the received print job list by using the display control unit 312 (S1808). FIG. 19 is a diagram illustrating an example of a list display screen 1901 displaying the print job list displayed in S1808. In the list display screen 1901 illustrated in FIG. 19, the list of print jobs is assumed to be acquired in the above process when the user identification information of the login user is assumed as "a3".

Figure 18:
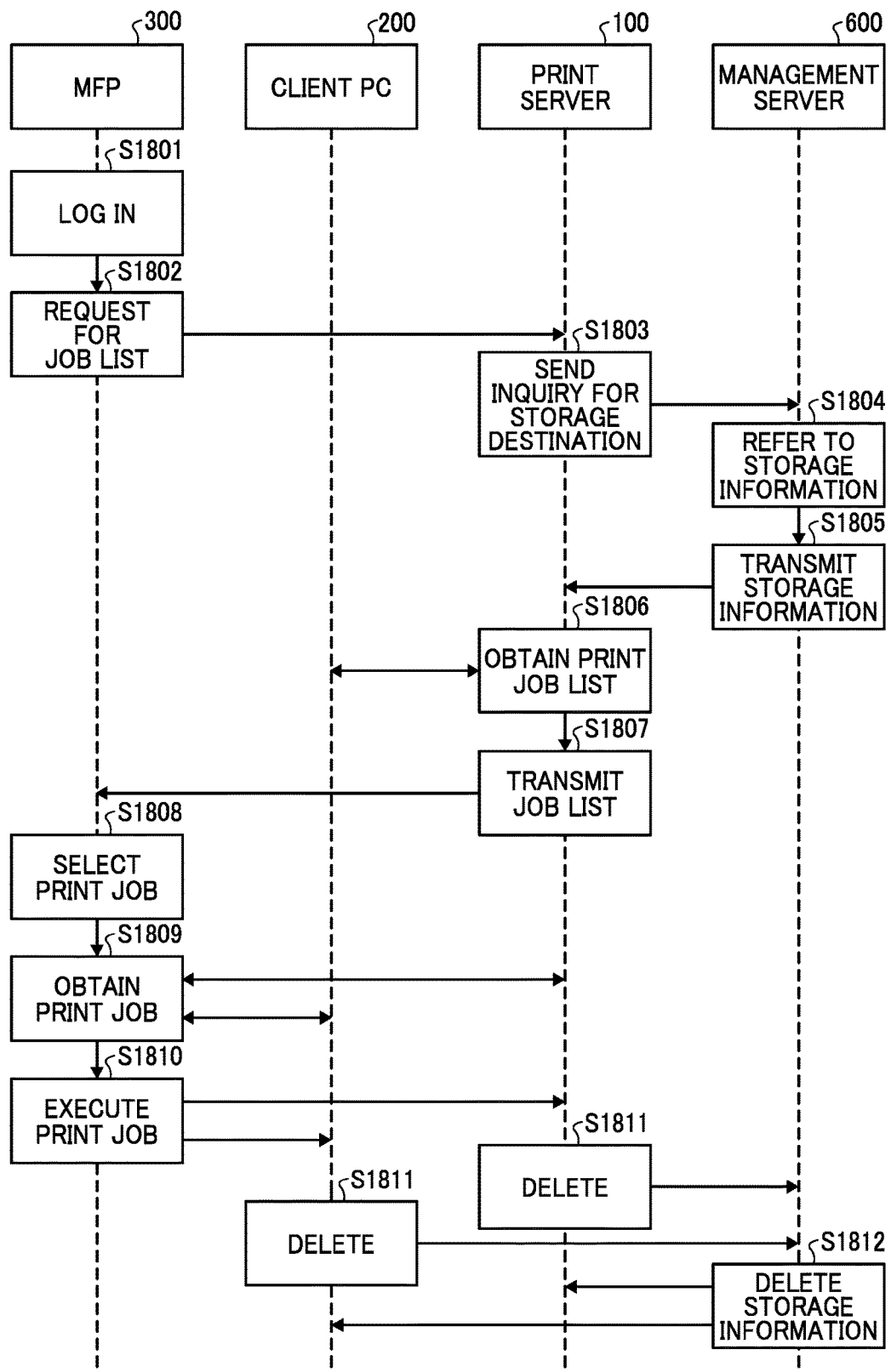
FIG. 18 is a sequence diagram illustrating one example of a process of executing a print job using a control program according to one of the embodiments.

A description is given of a case where the user selects "J4" that is sorted as an owner JOB from the list display screen 1901 and instructs to "execute" in S1808 of FIG. 18. In this case, the MFP 300 obtains "print data d4" associated with the print job ID of "J4" from the print server 100 having the server ID, "s1" (S 1809). If the storage destination of the print data associated with the selected print job is the client PC 200, the MFP 300 executes processing of obtaining the print data from the client PC 200 (S1809). Subsequently, the print job is executed using the print data obtained in S1809 (S1810).

When the user selects "J2", which is stored as a proxy JOB, with the list display screen 1901 and instructs to "execute", the MFP 300 obtains the "print data d4" associated with the print job ID, "J2", from the print server 100 having the server ID, "s1" (S1809). If the storage destination of the print data associated with the selected print job is the client PC 200, the MFP 300 executes processing of obtaining the print data from the client PC 200 (S1809). Subsequently, the print job is executed using the print data obtained in S1809 (S1810).

When the print job is executed in S1810, a notification of print job execution completion (print job execution completion notification) is transmitted to the print server 100 or the client PC 200, which is the storage destination of the print job (S1810). Upon receiving the print job execution completion notification in S1810, the print server 100 or the client PC 200 deletes the print job (S1811).

The print job is deleted in S1811 regardless of whether the completed print job is done by the owner user or the proxy user. In some of the embodiments, the print job set for the proxy user may be set "not to be deleted", in advance. In this case, the processing of deleting the print job is directly performed to the print server 100 and the client PC 200.

Additionally, the deletion processing may be executed when a predetermined time, which may be set by a user or a designer, has elapsed after the print job is executed, or when conditions set in advance is satisfied. The conditions may be, for example, regarding association with other processing, and for example, set by a user or a designer.

The deletion processing in S1811 deletes the print job that is completely executed, also deletes the storage information. That is, "the number of print jobs" corresponding to the combination of the user identification information and the proxy user identification information is subtracted from the storage information (see FIG. 12) stored in each of the print server 100 and the client PC 200.

When the number of print jobs becomes zero as a result of the subtraction processing in S1811, the management server 600 is notified of a corresponding combination of the user identification information and the proxy user identification information. Then, the management server 600 deletes the corresponding data in each of the server side location information storage unit 621 and the client side location information storage unit 622 (S1812).

As described above, according to the program of the embodiment, the storage destinations and the user identification information associated with all of the print jobs each of which is stored in one of the print server(s) 100 and the client PC(s) 200, each of which are provided in different sites, are centrally managed with the management server 600. With this configuration, a user is able to logs in the MFP 300 provided at any site to enable the MFP 300 to execute any print jobs stored in any places, as long as the print job is associated with the user identification information associated with the user that logs in the MFP 300.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing system, comprising:
one or more information processing apparatuses each configured to store a print job that is executable with an image forming apparatus, each of the one or more information processing apparatuses including,
a first memory configured to store the print job in response to a request to store the print job according to user operation, and
first circuitry configured to transmit, through a network, user identification information identifying one or more users who are allowed to execute the print job stored in the first memory, the user identification information including (i) owner identification information and proxy user identification information, the owner identification information identifying an owner user who generates the print job and the proxy user identification information identifying a proxy user who is authorized by the owner to execute the print job; and
a management apparatus configured to manage the one or more information processing apparatuses and the one or more users associated with the print job, the management apparatus including,
a second memory configured to store association information associating, for each print job, the user identification information transmitted from the first circuitry and apparatus identification information identifying one of the one or more information processing apparatus storing the print job such that, for each of the one or more information processing apparatuses, the association information associates a respective one of the one or more information processing apparatuses storing the print job with the owner of the print job and the proxy user authorized by the owner of the print job to execute same, and
second circuitry configured to,
specify apparatus identification information associated with selected ones of the one or more information processing apparatuses based on the user identification information transmitted to the management apparatus in response to use of the image forming apparatus, and
transmit, through the network, a list of information processing apparatuses according to the apparatus identification information of the selected ones of the one or more information processing apparatuses.

2. The information processing system of claim 1, wherein the first circuitry of the information processing apparatus is further configured to:
transmit an inquiry for location information of the print job to the management apparatus when the first circuitry receives an execution request to execute the print job from the image forming apparatus;
generate print job list information associated with user identification information related to the execution request, the print job list information including print jobs stored in at least one of the one or more information processing apparatuses specified in the association information based on the user identification information associated with the execution request, and
the second circuitry of the management apparatus is further configured to:
receive information including the user identification information of the one or more users from the first circuitry; and
add to the association information, when the information is newly received and not stored in the second memory, the user identification information included in the information and the apparatus identification information which uniquely identifies the information processing apparatus.

3. The information processing system of claim 2, wherein, when one print job is deleted from the information processing apparatus, a number of print jobs for user identification information associated with the deleted print job is reduced by one, and
when the number of print jobs related to each user identification information associated with the deleted print job becomes zero,
the first circuitry transmits the user identification information and the apparatus identification information associated with the number of print jobs, which becomes zero, to the management apparatus, and
the second circuitry deletes, from the association information stored in the second memory of the management apparatus, the user identification information and apparatus identification information received from the first circuitry.

4. The information processing system of claim 1, wherein the information processing apparatus includes a site server set as a reference destination of the image forming apparatus.

5. The information processing system of claim 1, wherein the information processing apparatus includes a client terminal configured to generate the print job.

6. The information processing system of claim 3, wherein the print job is deleted from the information processing apparatus when the information processing apparatus receives a notice of completion of executing the print job from the image forming apparatus.

7. A management apparatus configured to manage one or more information processing apparatuses and one or more users associated with a print job, the management apparatus comprising:
a memory configured to store association information associating, for each print job, a user identification information transmitted from the information processing apparatus and apparatus identification information, the user identification information including (i) owner identification information and proxy user identification information, the owner identification information identifying an owner user who generates the print job and the proxy user identification information identifying a proxy user who is authorized by the owner to execute the print job, and the apparatus identification information identifying one of the one or more information processing apparatus storing the print job such that, for each of the one or more information processing apparatuses, the association information associates a respective one of the one or more information processing apparatuses storing the print job with the owner of the print job and the proxy user authorized by the owner of the print job to execute same, and
circuitry configured to, specify apparatus identification information of associated with selected ones of the one or more information processing apparatuses based on the user identification information transmitted to the management apparatus in response to use of an image forming apparatus, and transmit, through a network, a list of information processing apparatuses according to the apparatus identification information of the selected ones of the one or more information processing apparatuses.

8. The management apparatus of claim 7, wherein the circuitry is further configured to:

receive information including the user identification information of the one or more users from the information processing apparatus; and add to the association information, when the information is newly received and not stored in the memory, the user identification information included in the information and the apparatus identification information which uniquely identifies the information processing apparatus.

9. The management apparatus of claim 8, wherein, when one print job is deleted from the information processing apparatus, a number of print jobs for user identification information associated with the deleted print job is reduced by one, and when the number of print jobs related to each user identification information associated with the deleted print job becomes zero, the circuitry receives the user identification information and the apparatus identification information associated with the number of print jobs, which becomes zero, and the circuitry deletes, from the association information stored in the memory, the user identification information and apparatus identification information received.

10. The management apparatus of claim 7, wherein the information processing apparatus includes a site server set as a reference destination of the image forming apparatus.

11. The management apparatus of claim 7, wherein the information processing apparatus includes a client terminal configured to generate the print job.

12. The management apparatus of claim 9, wherein the circuitry deletes, from the memory, association information associated with the user identification information and apparatus identification information in response to a notification from the information processing apparatus that receives a notice of completion of executing the print job from an image forming apparatus.

13. A non-transitory recording medium storing a plurality of instructions which, in response to execution of one or more processors, cause the processors to perform a method, comprising:

receiving, from one or more information processing apparatuses through a network, user identification information identifying one or more users who are allowed to execute a print job executable with an image forming apparatus, the user identification information including (i) owner identification information and proxy user identification information, the owner identification information identifying an owner user who generates the print job and the proxy user identification information identifying a proxy user who is authorized by the owner to execute the print job;

storing association information associating for each print job the user identification information received from the information processing apparatus and apparatus identification information identifying one of the one or more information processing apparatus storing the print job such that, for each of the one or more information processing apparatuses, the association information associates a respective one of the one or more information processing apparatuses storing the print job with the owner of the print job and the proxy user authorized by the owner of the print job to execute same;

specifying apparatus identification information associated with selected ones of the one or more information processing apparatuses based on the user identification information received in response to use of the image forming apparatus; and transmitting, through the network, a list of information processing apparatuses according to the apparatus identification information of the selected ones of the one or more information processing apparatuses.

14. The non-transitory recording medium of claim 13, wherein the method executed by the one or more processors further comprises:

receiving information including the user identification information of the one or more users from the information processing apparatus; and adding to the association information, when the information is newly received and not stored in a memory, the user identification information included in the information and the apparatus identification information which uniquely identifies the information processing apparatus.

15. The non-transitory recording medium of claim 14, wherein the method executed by the one or more processors further comprises:

when a number of print jobs related to each user identification information associated with the deleted print job becomes zero, receiving the identification information and the apparatus identification information associated with the number of print jobs, which becomes zero, and deleting, from the association information stored in the memory, the user identification information and apparatus identification information received.

16. The non-transitory recording medium of claim 13, wherein the information processing apparatus includes a site server set as a reference destination of the image forming apparatus.

17. The non-transitory recording medium of claim 13, wherein the information processing apparatus includes a client terminal configured to generate the print job.

* * * * *